March 5, 1968     A. G. WELK     3,371,939
MOBILE BULK MATERIAL HANDLER
Filed April 11, 1966     2 Sheets-Sheet 1
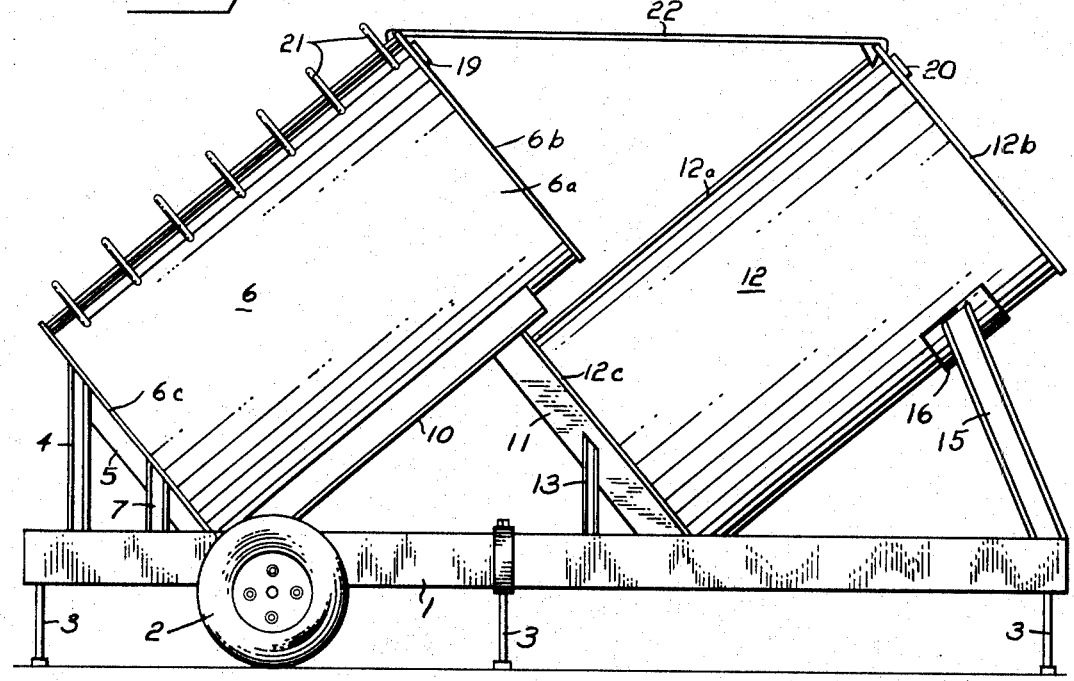
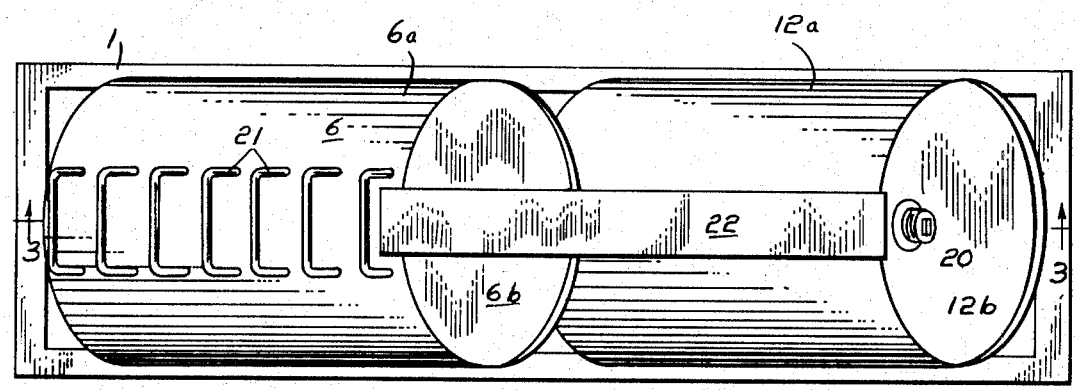
INVENTOR.
AUGUST G. WELK
BY
*Wells & St. John*
ATTYS.

March 5, 1968
A. G. WELK
3,371,939
MOBILE BULK MATERIAL HANDLER
Filed April 11, 1966
2 Sheets-Sheet 2
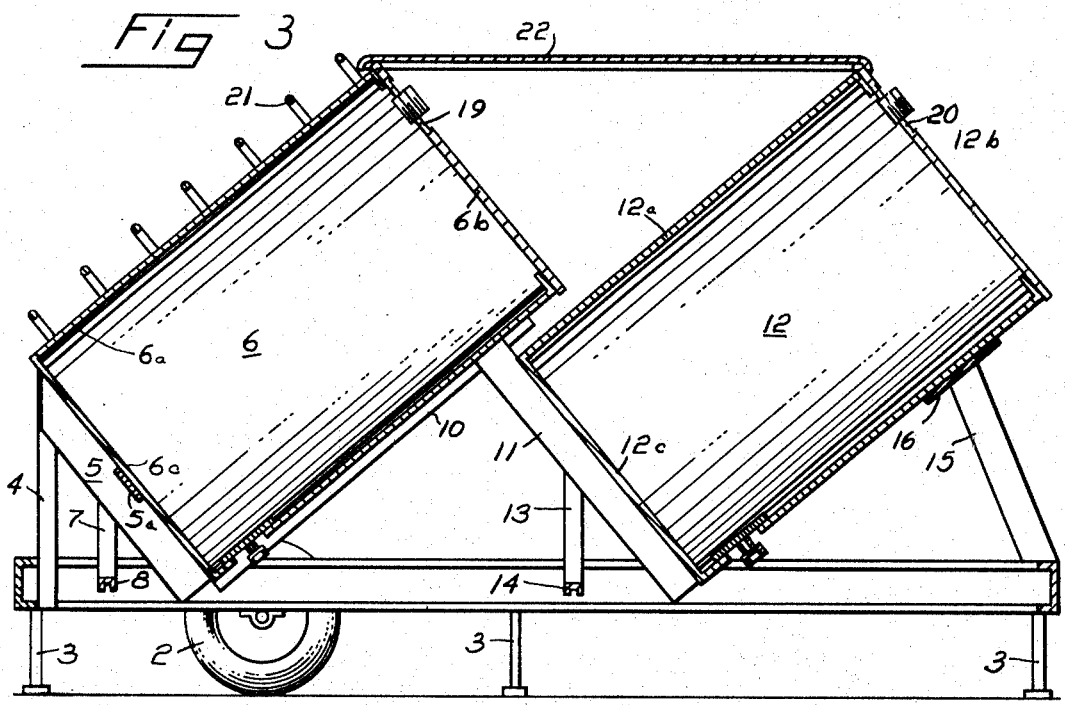
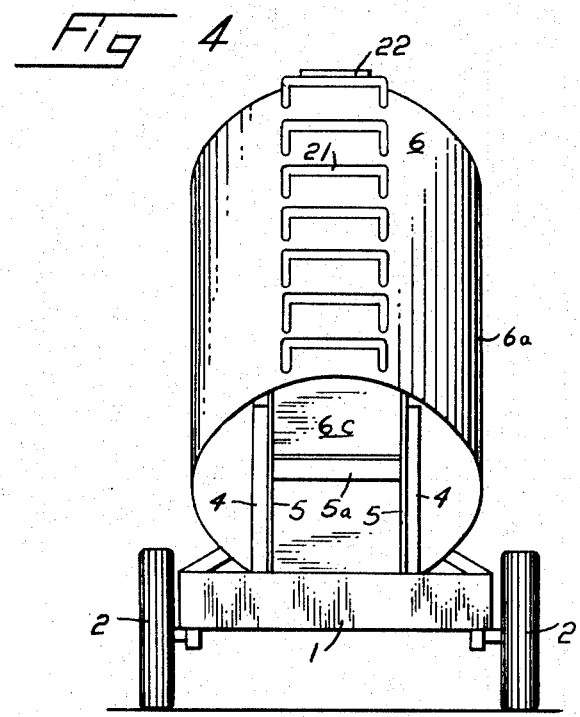
INVENTOR.
AUGUST G. WELK
BY
ATTYS.

United States Patent Office

3,371,939
Patented Mar. 5, 1968

3,371,939
MOBILE BULK MATERIAL HANDLER
August G. Welk, Spokane, Wash., assignor to Welk Brothers Metal Products, Inc., Spokane, Wash., a corporation of Washington
Filed Apr. 11, 1966, Ser. No. 541,695
3 Claims. (Cl. 280—5)

This invention relates to a tank assembly for the storage and handling of bulk materials. It is the principal purpose of the invention to provide an assemblage of a plurality of bulk tanks on a portable framework wherein the tanks are inclined to the horizontal so that all interior surfaces of the tanks are tilted sufficiently to cause the material to flow to the lowermost corner.

It is also a purpose of the invention to provide a portable tank assembly of this character wherein the tanks can be filled to substantially complete capacity without need for spreading devices and all of them emptied with no interior mechanical devices using only exterior loading and unloading devices.

The nature and advantages of the invention will be more fully explained in the following description and the accompanying drawings wherein a preferred form of the invention is shown.

In the drawings:

FIGURE 1 is a side view of the portable bulk material handler;

FIGURE 2 is a plan view of the device;

FIGURE 3 is a sectional view taken on the line 3—3 of FIGURE 2; and

FIGURE 4 is an end view of the device.

Referring now to the drawings, the bulk material handler utilizes a main supporting frame 1 which is a trailer frame equipped with wheels 2 and with retractable pedestals 3 which are let down when the device is standing at a filling or discharging location. The supporting frame includes uprights 4 adjacent one end which are secured at their lower ends to the frame 1 and at their upper ends to ribs 5 that are provided on a tank 6. The tank 6 has a cylindrical body wall 6a with circular ends 6b and 6c. Shorter supports 7 are also provided. They extend up from a frame cross beam 8 to the ribs 5. The ribs 5 are connected by a cross bar 5a.

The cylindrical wall 6a carries two exterior bars 10 which are in turn supported by bars 11 which are secured to the bottom wall 12c of another tank 12. The bars 11 are braced by uprights 13 extending up from a frame cross beam 14. The right hand end of the frame 1 has inclined braces 15 extending up to the tank 12 and secured to a curved plate 16 that seals the tank wall 12a and supports it.

The tanks 6 and 12 have outlet gate valves 17 and 18 respectively at their lowermost portions so that all of the contents of the tanks can run out. The top cylindrical walls 6b and 12b also have inlet gate valves 19 and 20 respectively. Access to the valves 19 and 20 is by means of ladder rungs 21 on the tank 6 and a catwalk or bridge 22 from the tank 6 to the tank 12.

With this arrangement when the inclination of the tanks is such that all parts of the interior incline more than about 38 degrees to the horizontal as shown, the tanks can be filled with granular materials and emptied readily. The tanks can be filled to capacity because of their angular position without pulling in spreaders at the top. There are really no horizontal or near horizontal surfaces for material to lodge on.

This construction makes it easy to wash out the tank interiors when it is desired to change from storage of one material to storage of another.

It is believed that the nature and advantages of the invention will be clear from the foregoing description.

I claim:

1. A portable tank assembly for handling bulk materials comprising:
    a frame having supporting wheels and pedestals for transporting the assembly supporting it at selected locations;
    a plurality of cylindrical tanks on the frame arranged in inclined overlapping relationship to each other, each tank having all of its walls inclined to the horizontal at least 38 degrees;
    supports on the frame extending up to the tanks and joined to the ends and the sides thereof;
    a filling inlet to each tank at the top thereof; and
    an outlet valve at the bottom of each tank.

2. The device defined in claim 1 wherein the supports on the frame for the tanks include inclined bars on the lower end of one tank extending up to and secured to the other tank.

3. The device defined in claim 1 wherein the supports for the tanks are spaced from the lowermost portions of both tanks and the outlet valves.

References Cited

UNITED STATES PATENTS

| | | | |
|---|---|---|---|
| 1,465,665 | 8/1923 | Grindle | 280—5 XR |
| 2,735,725 | 2/1956 | Galle | 302—52 |

GERALD M. FORLENZA, *Primary Examiner.*

ALBERT J. MAKAY, *Examiner.*